United States Patent
Yasukawa

(10) Patent No.: US 7,219,624 B2
(45) Date of Patent: May 22, 2007

(54) ANIMAL EXCRETIONS DISPOSAL MATERIAL AND A MANUFACTURING METHOD THEREFORE

(76) Inventor: Yoichi Yasukawa, 4-9-13, Nishioizumi, Nerima-ku, Tokyo (JP)

( * ) Notice: Subject to any disclaimer, the term of this patent is extended or adjusted under 35 U.S.C. 154(b) by 0 days.

(21) Appl. No.: 11/378,381

(22) Filed: Mar. 20, 2006

(65) Prior Publication Data

US 2006/0219183 A1    Oct. 5, 2006

Related U.S. Application Data

(63) Continuation of application No. PCT/JP03/16728, filed on Dec. 25, 2003.

(51) Int. Cl.
    *A01K 29/00*    (2006.01)
(52) U.S. Cl. .................. 119/171; 502/402
(58) Field of Classification Search ........... 119/171, 119/172, 173; 502/80, 401, 402
    See application file for complete search history.

(56) References Cited

U.S. PATENT DOCUMENTS

| | | | |
|---|---|---|---|
| 4,686,937 A * | 8/1987 | Rosenfeld | 119/173 |
| 4,704,989 A * | 11/1987 | Rosenfeld | 119/173 |
| 5,664,523 A * | 9/1997 | Ochi et al. | 119/173 |
| 5,724,915 A * | 3/1998 | Ochi et al. | 119/173 |
| 6,578,520 B2 * | 6/2003 | Otsuji et al. | 119/165 |
| 6,802,281 B2 * | 10/2004 | Otsuji et al. | 119/169 |
| 2004/0037792 A1 * | 2/2004 | Hiramoto et al. | 424/65 |
| 2006/0213448 A1 * | 9/2006 | Yasukawa | 119/171 |

FOREIGN PATENT DOCUMENTS

| | | | |
|---|---|---|---|
| JP | 3-94895 | | 4/1991 |
| JP | 6-7051 | * | 1/1994 |
| JP | 2000-226301 | | 8/2000 |
| JP | 2003-52261 | | 2/2003 |

OTHER PUBLICATIONS

Shoji Yasuhisa et al., Material for Treating Excretion of Small Animal and its Reproduction, Publication No. 11-225600 and Publication Date: Aug. 24, 1999.

* cited by examiner

*Primary Examiner*—Peter M. Poon
*Assistant Examiner*—David J. Parsley
(74) *Attorney, Agent, or Firm*—Staas & Halsey LLP

(57) ABSTRACT

A manufacturing process for cat litter having 30 to 80 parts of weight of a powdered organic substance as the base material having particle sizes less than 840 μm, 1 to 10 parts of weight of a powdered highly absorbing resin, 5 to 20 parts of weight of powders of either green tea leaves before extraction of the water soluble effective ingredient or Japanese Cypress, 3 to 10 parts of weight of a binder consisting of a highly water soluble natural macromolecule having particle sizes less than 74 μm, being input into a high-speed mixer, and the mixture evenly mixed by this high-speed mixer by agitating blades rotating at a speed of 300 to 800 rpm are granulated by a granulating device, and then the granules thus obtained are dried by a drier until they become to have a bulk density of 0.20 to 0.50 g/cm$^3$ and a water absorbing capacity of 1.3 to 3.5 times of their own weight.

1 Claim, 3 Drawing Sheets

Flow of a Manufacturing Process According to the Conventional Method

Flow of a Manufacturing Process According to the Conventional Method

ANIMAL EXCRETIONS DISPOSAL MATERIAL AND A MANUFACTURING METHOD THEREFORE

This application is a continuing application, filed under 35 U.S.C. §111(a), of International Application PCT/JP2003/016728 filed Dec. 25, 2003, and claims the benefit of PCT International Application Number PCT/JP2003/016728 filed Dec. 25, 2003, the disclosure of which is incorporated herein by reference.

BACKGROUND OF THE INVENTION

1. Field of the Invention

The present invention relates to an animal excretions disposal material in order to treat and dispose of the excretory products of pets and animals and a manufacturing method therefore.

2. Description of the Related Art

The animal excretions disposal materials such as cat litters have been traditionally used for treating and disposing excretory products of pets and animals. These animal excretions disposal materials are the man-made granules mostly made of sand, bentonite, zeolite, and/or pulp.

Among them, those mineral based disposal materials made of bentonite or zeolite are non-combustible, and therefore, cause certain inconveniences to ordinary households when disposing because they are only collectible on Non-combustible Garbage Collection Days.

On the other hand, those organic disposal materials made of pulp or pulp sludge as the main material thereof would cost expensive, thus priced higher, in comparison with those mineral based disposal materials. Furthermore, they have to be actually disposed as raw garbage in most cases because they tend to float on water surface and thus less flushable due to their very light specific gravity and sometimes cause clogging of sewer pipe in spite of their claiming to be flushable.

In other aspect, those disposal materials as above referred can treat and dispose animal excretions by absorbing by themselves, however, it is impossible for the users to dispose occasionally the part of them which have been moistened by absorbing animal excretions because those animal excretions osmose into and spread inside the layers of animal excretions disposal material used. Thus, the users are compelled to use those animal excretions disposal materials until they have been entirely used for absorbing animal excretions.

Accordingly, those animal excretions disposal materials tend to stay longer in the litter box from the point of their first absorption of animal excretions until their disposition, and thus, to start smelling bad and being unsanitary.

In order to solve these problems, it was noticed that used green tea leaves, which used to be disposed as industrial wastes, have a property of antifungal and antibacterial function, and therefore, could be used for the material to be mixed in animal excretions disposal materials. Thus, a manufacturing method thereof has been proposed. (Reference: Patent Publication # Hei-6-7051)

As having been pointed out in the proposal for a patent as above referred, it is definitely necessary for the production of such animal excretions disposal materials to find out a supply source of such used green tea leaves in large quantity. Otherwise, a manufacturing method thereof doesn't fit to factory production.

However, in order to obtain such used green tea leaves in large quantity, it was only possible way to obtain those used leaves from a bottling factory that should have been generated as the residue in large quantity after extraction of green tea for drinking.

In this case, it becomes necessary to purchase the used green tea leaves, as residue, in big lot from a factory bottling green tea for drinking, and keep them in storage at a certain place in the manufacturing factory of animal excretions disposal materials.

The FIG. 2 is an illustration to show the flow of processes after having received such used green tea leaves from a bottling factory. (See: FIG. 2)

As shown in the FIG. 2, the used green tea leaves received are dried at Process-11, coarsely milled at Process-12, and then, mixed together with other materials at Process-1 where the respective necessary quantities, mixing ratio, etc. are fixed. The mixture thus obtained is put into a high speed mixer for mixing at Process-2, granulated by a granulator at Process-3, sized by a /sizing machine at Process-4 and dried by a drier at Process-5, thus the final product is obtained.

In general, the used green tea leaves received are highly perishable, if left untouched for long time, due to their high moisture content as much as 80%, especially in summer season, therefore, it is necessary for a factory to equip with an expensive dryer with a large drying capacity as much as 1.0 ton per hour.

Furthermore, an expensive milling machine is needed to pulverize the dried used green tea leaves into an appropriate size as well.

Thus, it requires a good amount of fund to construct such a factory, and therefore, it has been considered difficult to manufacture such animal excretions disposal materials by modern factory system even though the manufacturing method has been regarded as an useful way of recycling industrial wastes contributing to environmental preservation.

SUMMARY OF THE INVENTION

An aspect of the present invention is to provide an animal excretions disposal material having adequate functions that can be manufactured at a factory without such expensive equipment and be supplied at lower price by eliminating wasteful and/or expensive processes, and a manufacturing method thereof.

An inventor of the present invention noticed that wasteful and/or expensive processes of manufacturing such animal excretions disposal material can be eliminated by using powdered green tea leaves, as a material having antifungal/antibacterial and deodorizing effect, in instead of using used green tea leaves as a material to be mixed in such animal excretions disposal material.

By applying the above concept, it becomes easier to realize mass-production method at a factory by lowering initial investment in the equipment and machinery as well as manufacturing cost and expenses. Furthermore, an input quantity of powdered green tea leaves required to get an expected effect will be considerably reduced in comparison with that of used green tea leaves since the former is used in the condition containing more water-soluble effective ingredients than the latter.

According to a first embodiment of the invention, an animal excretions disposal material is granules of a mixture of natural organic substance as the base material, highly water absorbable resin, powdered antifungal/antibacterial substance and binder, wherein powdered antifungal and antibacterial substance is characteristically either powders of Japanese Cypress or powders of fresh green tea leaves before extraction of water-soluble effective ingredient.

According to a second embodiment of the invention, an animal excretions disposal material is characteristically an animal excretions disposal material, wherein a natural organic antifungal and antibacterial substance is an organic material of wood powders of 30 to 80 parts of weight having particle sizes below 840 μm, a highly water absorbable resin is a powdered resin of 1 to 10 parts of weight, an antifungal and antibacterial substance is a powder of used green tea leaves of 5 to 20 parts of weight to be generated through the production process of green tea for drinking as industrial wastes or a powder of Japanese Cypress to be generated through the wood and lumber processing process as industrial wastes, and a binder is a powder of highly water soluble natural macromolecule of 3 to 10 parts of weight having sizes of 74 μm or smaller or a powder of bentonite with high viscosity of 15 to 30 parts of weight having sizes of 74 μm or smaller.

According to a third embodiment of the invention, an animal excretions disposal material in the second embodiment of the invention is the characteristic animal excretions disposal material, wherein a natural organic substance is powdered sawdust of Japanese Cypress, and an antifungal and antibacterial substance is powdered sprays and/or branches of Japanese Cypress.

According to a fourth embodiment of the invention, a manufacturing method of an animal excretions disposal material is a characteristic manufacturing method of the animal excretions disposal material, wherein the product is obtained by putting the natural organic substance as the base material, highly water-absorbing resin, the powdered fresh green tea leaves before extraction of water-soluble effective ingredient or the powdered Japanese Cypress both as antibacterial and deodorant substance, and a binder into a high speed mixer for mixing, granulating the mixture evenly mixed by this high speed mixer by a granulating device, and then drying the granules thus obtained by a drier.

According to a fifth embodiment of the invention, a manufacturing method of an animal excretions disposal material is a characteristic manufacturing method of an animal excretions disposal material as described above for the fourth embodiment of the invention, wherein the product is obtained by putting a powdered organic substance, as main material, of 30 to 80 parts of weight having particle sizes below 840 μm, powdered highly water-absorbing resin of 1 to 10 parts of weight, powdered fresh green tea leaves before extraction of water-soluble effective ingredient or powdered Japanese Cypress of 5 to 20 parts of weight, and highly water soluble polymer of 3 to 10 parts of weight having particle sizes below 74 μm or the binder consisting of bentonite having high viscosity of 15 to 30 parts of weight into a high speed mixer for mixing, granulating the mixture which was evenly mixed by this high speed mixer equipped with agitating blades rotating at a rate of 300 to 800 rpm, and drying the granules thus obtained until they become to have a bulk density of 0.20 to 0.50 g/cm$^3$ and a water absorbing capacity of 1.3 to 3.5 times of their own weight.

DETAILED DESCRIPTION OF THE PREFERRED EMBODIMENTS

The present embodiments will be further described below by referring the drawings, etc.

Figure 1:
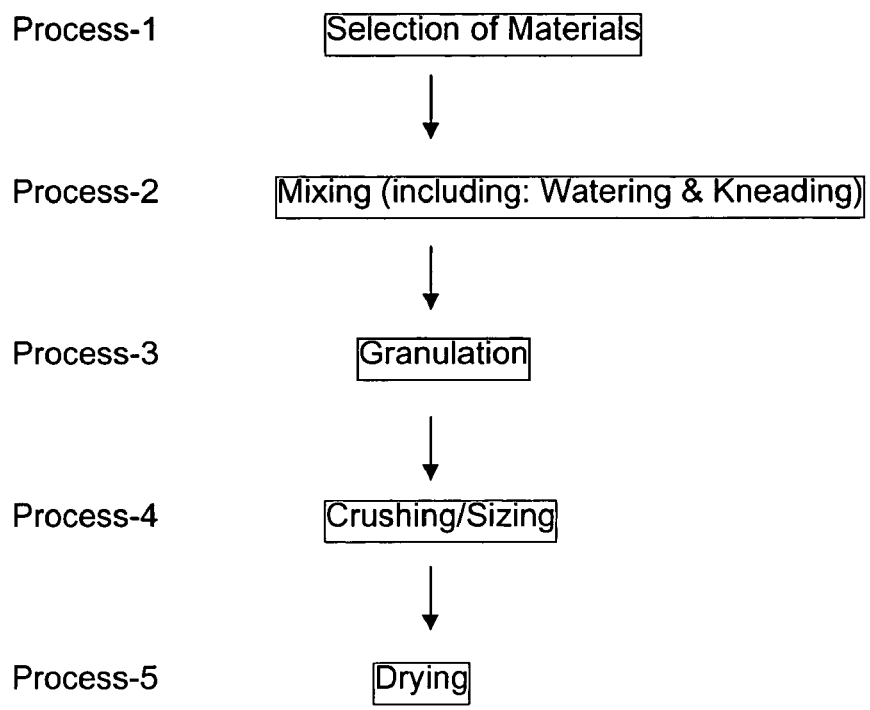
FIG. 1 shows a flow of processes of manufacturing method of an animal excretions disposal material according to an embodiment of the present invention.

FIG. 1 is an illustration, or a flow chart, of the manufacturing process to manufacture the animal excretions disposal material according to an embodiment of the present invention.

Figure 2:
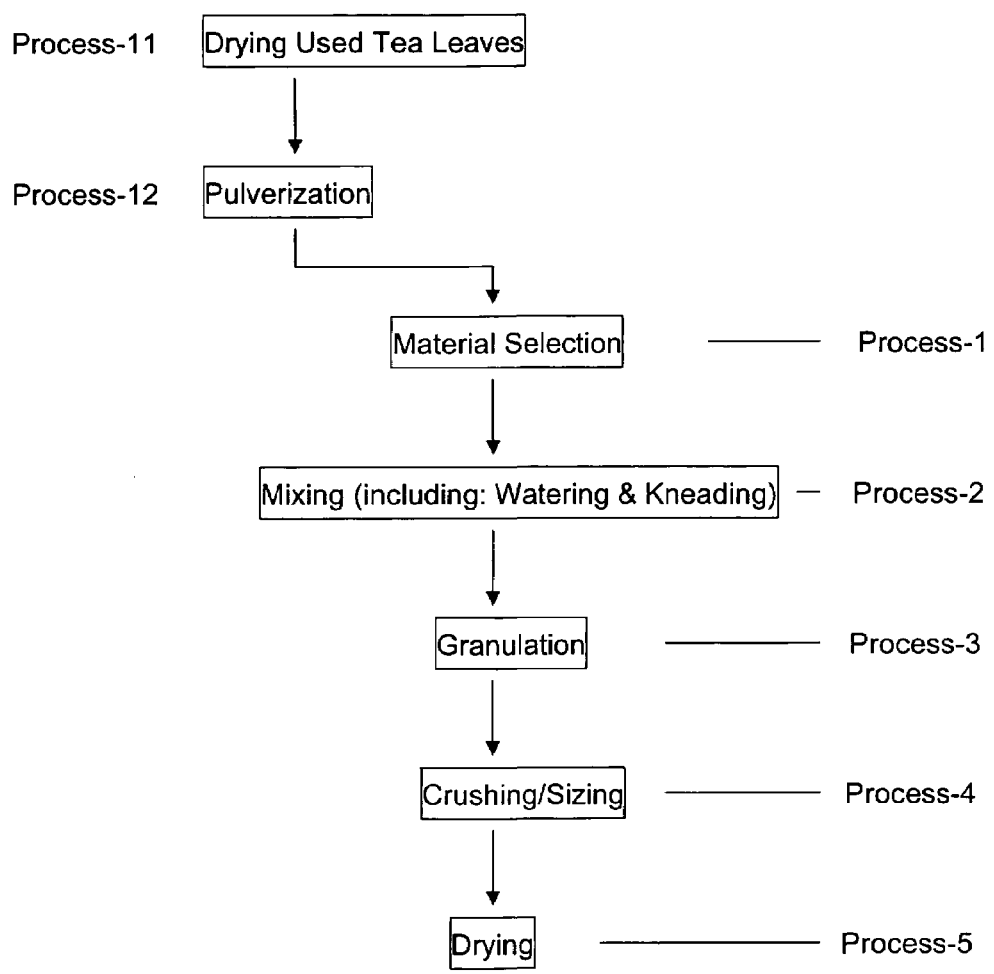
FIG. 2 illustrates a flow of processes of the traditional manufacturing method of an animal excretions disposal material.

As shown in FIG. 1, the manufacturing method according to an embodiment of the present invention does not include the processes 11 and 12 which the traditional manufacturing method has as shown in FIG. 2. Therefore, the manufacturing method according to an embodiment of the present invention does not require an expensive drier for the process 11 and a milling machine for the process 12.

In the manufacturing method according to an embodiment of the present invention, the manufacturing process starts with the process 1 where the kind, quality, quantity and the mixing ratio of the materials to be input in the high speed mixer are determined.

The materials are composed of a base material, polymer, powdered antibacterial and deodorant substance, and a binder. The quantities to be input are 30 to 80 parts of weight of the base material, 1 to 10 parts of weight of polymer, 5 to 20 parts of weight of antibacterial and deodorant substance, and 3 to 30 parts of weight of a binder.

The base material is powdered wood flour or other natural organic substance, or powders of recycled pulp, paper or other organic substance which have particle sizes below 840 μm, or more favorably below 250 μm. Other natural organic substance includes, for example, grass, rice husks, orange peel, husks of peanut, peat moss or wood flour.

The polymer to be used is a polymer which can maintain a solid form even after having absorbed liquid of 10 to 2,000 times of its own weight. Such polymer includes, for example, vinyl ester, ethylene-family unsaturated carbonic acids or copolymeric saponification derivatives of such, graft polymers of starch and acrylic acid, bridged polyacrylic acid compounds, copolymers of vinyl alcohol and acrylic acid, partially hydrogenated polyacrylonitriles, bridged polyethylene glycol, chitosan salts, or pullulan gels, etc.

The powder of antibacterial and deodorant substance is a powder of green tea leaves which is inevitably generated from the tea making process and generally called as a powdered green tea. Since this powdered green tea is sometimes used for drinking tea and contains rich water soluble effective ingredients such as catechin, they are more effective than used tea leaves.

The binder to be used is preferably a binder which can clump the base material as specified above easily, and can breakup quickly when get moisture and be flushed down to the toilet without causing clogging of sewer pipe. Samples of such water soluble binder are PVA (Polyvinyl Alcohol), CMC (Carboxymethyl Cellulose), MC (Methyl Cellulose), α-starch(starch watered and heated into paste), pulluran, gelatin, etc. and samples of binder to be dissolved in alcohol when used are HEC (Hydroxyls Ethyl Cellulose),HPC(Hydroxyl Propyl Cellulose), PVP (Poly Vinyl Pyrrolidone), etc.

When we use one of these materials as a binder, the quantity to be used is, in any case, 5 to 10 parts of weight. However, it is also possible to use bentonite with higher viscosity, then the quantity to be used should be 20 to 30 parts of weight instead.

At the Process-2, the materials measured at the Process-1 are mixed, watered, and kneaded.

A desirable high-speed mixer to be used is in general a horizontal type equipped with an injection nozzle of water inside a vessel, and includes agitating blades provided at a plurality of stages on a rotary shaft inserted through the inside of the vessel, and a bottomed entirely-porous cylindrical frame including a scraper blade rotatably provided in the form of a cage having coarse openings within the vessel and outside a locus of rotation of the agitating blades.

Operation of the Process-2 is performed by rotating the inner blades at a speed of 300 to 800 rpm, or preferably at a speed of 500 to 600 rpm, and the outer cylindrical frame at a speed of 16 rpm or more in the adverse direction of that of the inner blades.

In the initial stage of this process, mixing operation is first carried out for a certain length of time (5 to 15 minutes), then watering operation is done, where 20 to 30 parts of weight of water is input, and further high speed mixing is continued for 5 to 15 minutes. The last operation is called kneading operation. By this process, being carried out at high speed, the materials having different specific gravities and particles sizes are mixed evenly and supplied to a granulating device at the next process, which is the Process-3.

Granulation at the Process-3 is carried out by a roll type disc pelletizer. The die of the pelletizer has holes of a diameter of 2.5 to 5.5 mm. The granules made by an extruding type pelletizer are pillar shaped and sometimes have length of 3 to 50 mm, therefore, they have to be sized by a crashing/sizing machine at the next process, i.e. the Process-4, within the length of 5.5 mm and smaller.

A crashing/sizing machine (chopper or flash mill) is a vertical type machine equipped with a cylindrical vessel having multiple holes on its wall and with multi-layered wing shaped cutters fitted to the rotating axis located on the center line of the inside of the vessel. The granules to be sized are supplied to the crashing/sizing machine from its top along with the direction of the rotating axis, and cut into the sizes within a diameter of 2 to 5.5 mm, and then supplied to the Process-5.

At the Process-5, the granules are dried by a drier such as a fluidized bed drier or a band drier until their moisture content reaches to 2 to 7%.

In addition to the example as above described, there are many variations and/or changes applicable, and all of them remain evenly within the scope of the present invention.

For example, the powdered Japanese Cypress can have similar effect as the antibacterial/deodorant substance with the powdered green tea leaves, or the machinery and equipment to be used for mixing, granulating and drying processes could be other type than those referred in the above described example if they have similar function and capacity of the machinery and equipment of the example. As for the powdered Japanese Cypress, those of ordinary sawdust is acceptable but the powders of sprays and/or branches of Japanese Cypress is more preferable because they contain normally two to three times of hinokitiol than the ordinary sawdust.

More detail explanation is given below by use of the actual examples.

EXAMPLE 1

After having measured materials: 55 parts of weight of a 100% sieved sawdust having bulk density of 0.3 and particle sizes less than 250 μm; 8 parts of weight of Aronzap, a highly water absorbing resin with relatively low degree of swelling (a product of Toagosei Co. Ltd.); 10 parts of weight of Sun Rose BS, a Carboxymethyl Cellulose (CMC) (a product of Nippon Paper Chemicals Co., Ltd.); and 15 parts of weight of powdered green tea leaves, which, as a whole, have bulk density of 0.3 and particle sizes less than 250 μm, collected among those obtained from the green tea making process as a by-product, charge them into Spartan Ryuser RM500, a mixing device (made by Fuji Paudal Co. Ltd.), and start mixing after the cover has been closed.

Mixing of the above materials was made by rotating the axis of revolution at a speed of 500 rpm while rotating the cylindrical frame with multiple holes in the opposite direction. After ten (10) minutes of mixing, 30 parts of weight of water was sprayed for two (2) minutes while mixing is continued, then the mixture was further mixed for kneading. The mixture thus obtained is evenly mixed and supplied to Disc Pelletter RV60, a rolling type disc pelletizer, having a die with multiple holes of 3.5 mm diameter and 5.0 mm thickness, made by Fuji Paudal Co., Ltd., for granulation.

The mixture kneaded and then supplied to the disc pelletter as referred above were granulated by passing through the holes of die where a roller pressed the mixture onto the die. The granules thus obtained were sized 15 mm.

There are often larger particles having length of 5.0 to 15.0 mm found among the granules, so they are supplied to Flash Mill (made by Fuji Paudal Co., Ltd.), a crushing/sizing machine equipped with a cylindrical vessel having multiple holes, and then sized into granules having particle sizes of 2.0 to 4.5 mm.

These sized granules were then conveyed to a fluidized bed drier in which heated air having temperature between 80 to 90° C. is blown, and dried for 45 minutes in the drier.

In the granules thus obtained, it was confirmed by sample analysis that each piece of granules contained powdered green tea evenly at a ratio of 15 parts of weight of powdered green tea in 100 g of granules.

EXAMPLE 2

By use of the materials: 70 parts of weight of 100% sawdust of Japanese Cypress having bulk density of 0.3 and particle sizes less than 250 nm; 12 parts of weight of α-starch; 8 parts of weight of Aronzap, a highly water absorbing resin with relatively low degree of swelling (a product of Toagosei Co. Ltd.), d) 10 parts of weight of Sunrose BS, a Sodium Carboxymethyl Cellulose (CMC) (a product of Nippon Paper Chemicals Co., Ltd.); and 15 parts of weight of 100% powdered sprays and/or branches of Japanese Cypress, having bulk density of 0.3 and particle sizes less than 250 μm, granules were manufactured in the same manner as that of the Example-1.

COMPARATIVE EXAMPLE

A Comparative Example was made in the same manner as that of the Example-1 but not including powdered green tea, which was obtained from the green tea making process, in the materials.

<Test of Antibacterial/Deodorant Performance>

Figure 3:
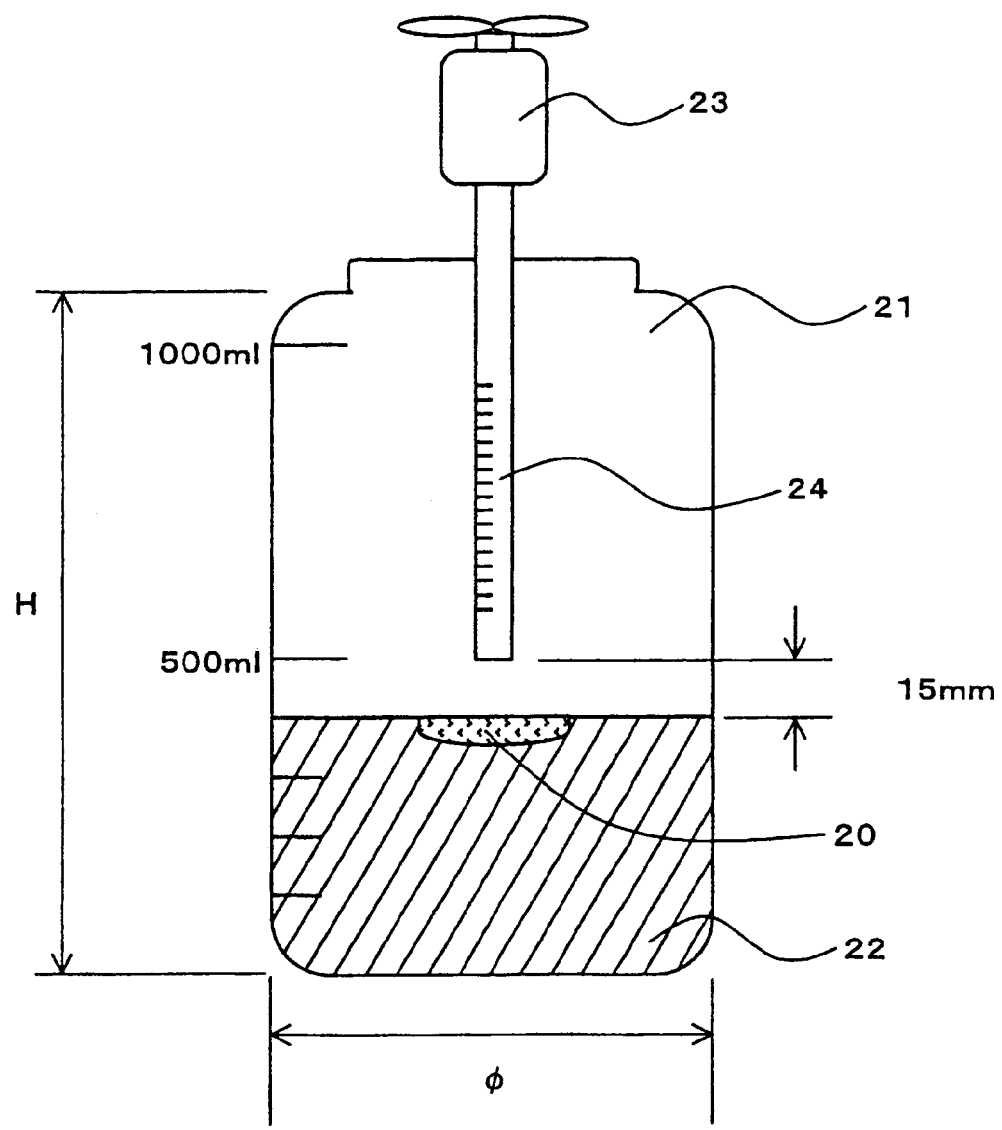
FIG. 3 shows a measuring method of the level of residual ammonia.

A measuring method of the level of residual alcohol uses sample granules, $NH_3$ reagent solution (having consistency of 29%)(#20) and a sample pot, having containment capacity of 100 ml, a diameter (φ)( of 95 mm and a height (H) of 170 mm. As shown in FIG. 3, the sample granules (# 22) of the Example-1, the Example-2 and the Comparative Example are respectively put in the sample pot (# 21) to the level of some 400 ml, and then close the sample pot (# 21) tightly by rubber stopper after having dripped 10 ml of $NH_3$ reagent solution (# 20) onto these granules (# 22).

The residual level of alcohol ($NH_3$) was measured by a detector tube (# 24) which has a suction pump (# 23) 10 minutes later. A detector tube used (# 24) was the detector tube No. 3La made by Gastech Co., Ltd. which is capable to sense an atmosphere of 200 ppm, and thus the following results were obtained;

TABLE 1

|  | <Example-1> | <Example-2> | <Comparative Example> |
| --- | --- | --- | --- |
| Antibacterial/ Deodorant powder | Powdered green tea | Powdered Japanese Cypress | None |
| Residual Level of $NH_3$ | 15 ppm | 17 ppm | 36 ppm |

Apparently, the Example-1 and the Example-2 which contain a antibacterial/deodorant substance showed drastically improved deodorant performance than the Prior Art Example which doesn't contain any antibacterial/deodorant substances.

When the granules of the Example-1 and the Example-2 are used as a cat litter, it becomes empirically apparent that these cat litters has more efficient deodorant performance because their ingredient have also antibacterial function to protect excretions from decaying.

Since most people, especially Japanese, like fragrance of green tea and/or Japanese Cypress, these cat litters can provide them with a fragrant effect as a side effect of their using.

As explained in detail in the above, the present invention embodies the following effects;

(1) It doesn't need such processes to dry the used green tea and to pulverize them into smaller particles which were needed for a conventional method of cat litter making since the powders of green tea leaves before extraction of water-soluble effective ingredient or Japanese Cypress is, in the present invention, mixed with a natural organic substance, as the base material, a highly water absorbing resin, and a binder. Furthermore, the antibacterial/deodorant effect of the product is equal to or more than that of the cat litters using used green tea leaves. This means, the present invention can provide the users with an effective product at cheaper price because it doesn't need an expensive drier and/or a grinding mill, thus can make cat litters at lower cost of machinery and equipment as well as processing while keeping profitability.

(2) It is possible to realize the effects as above featured by composing the materials at certain ratios, wherein the natural organic substance used is the powders of wood or other organic materials sized less than 840 μm, whose quantity is 30 to 80 parts of weight; the highly water absorbing resin is a powdered resin, whose quantity is 1 to 10 parts of weight; the antibacterial/deodorant substance is the powdered green tea to be generated from the green tea making process or the powders of Japanese Cypress to be generated from the lumber processing process, whose quantity is 5 to 20 parts of weight; and the binder is either a highly water soluable natural macromolecule having particle sizes less than 74 μm, whose quantity is 3 to 10 parts of weight, or the powders of bentonite with high viscosity, having particle sizes less than 74 μm, whose quantity is 15 to 30 parts of weight.

(3) The manufacturing method according to the present invention is a manufacturing method, wherein; the natural organic substance as the base material sized less than 840 μm having quantity of 30 to 80 parts of weight; the powders of highly water absorbing resin whose quantity is 1 to 10 parts of weight; the powdered antibacterial/deodorant substance being made of the powdered green tea before extraction of water-soluble effective ingredient or the powders of Japanese Cypress whose quantity is 3 to 10 parts of weight; and the binder being made of either a highly water soluable natural macromolecule having particle sizes less than 74 μm, whose quantity is 3 to 10 parts of weight, or the powders of bentonite with high viscosity, having particle sizes less than 74 μm, whose quantity is 15 to 30 parts of weight, are put into a high-speed mixer together and mixed evenly by such a high-speed mixer by an agitation blade rotating at a speed of 500 rpm or more, then the mixture thus obtained is granulated by a granulating device and dried by a drier until they become to have a bulk density of 0.20 to 0.50 g/cm$^3$ and a water absorbing capacity of 1.3 to 3.5 times of their own weight. Therefore, advantageously, it doesn't need any processes to dry the used green tea leaves and to pulverize them into smaller particles, thus, can eliminate such expensive equipment and machinery as drier and grinding mill, which were needed for the conventional manufacturing method, from the manufacturing process. Thus, the manufacturing method according to the present invention can save the equipment and machinery cost and the processing cost related thereto, thus, can supply to the users the product at cheaper price with reasonable profit. Furthermore, the product thus manufactured has the same level of or even more antibacterial/deodorant effect than those of cat litters using the used green tea leaves.

(4) The advantages and effects as described above are realizable by applying the manufacturing method according to the present invention, wherein the natural organic substance as the base material sized less than 840 μm having quantity of 30 to 80 parts of weight; the powders of highly water absorbing resin whose quantity is 1 to 10 parts of weight; the powdered antibacterial/deodorant substance being made of the powdered green tea before extraction of water-soluble effective ingredient or the powders of Japanese Cypress whose quantity is 3 to 15 parts of weight; and the binder being made of either a highly water soluable natural macromolecules having particle sizes less than 74 μm, whose quantity is 3 to 10 parts of weight, or the powders of bentonite with high viscosity, having particle sizes less than 74 μm, whose quantity is 15 to 30 parts of weight, are put into a high-speed mixer together and mixed evenly by such a high-speed mixer by an agitation blade rotating at a speed of 300 to 800 rpm, then the mixture thus obtained is granulated by a granulating device and dried by a drier until they become to have a bulk density of 0.20 to 0.50 g/cm$^3$ and a water absorbing capacity of 1.3 to 3.5 times of their own weight.

What is claimed is:

1. A manufacturing method of an animal excretions disposal material is a characteristic manufacturing method comprising:

inputting materials consisting of: powdered natural organic substance as the base material, powders of highly water absorbing resin, powdered antibacterial/deodorant substance consisting of green tea leaves before extraction of effective ingredient, and powdered binder into a high-speed mixer;

granulating the mixture evenly mixed by the said high-speed mixer; and making the product by drying the granules thus obtained; wherein, the inputting step comprising inputting the materials consisting of: 30 to 80 parts of weight of the powdered natural organic substance as the base material having particle sizes less than 840 μm, 1 to 10 parts of weight of the powders of highly water absorbing resin, 5 to 20 parts of weight of the powdered antibacterial/deodorant substance consisting of green tea leaves before extraction of effective ingredient, and 3 to 10 parts of weight of the powdered binder consisting of highly water soluble natural macromolecule having particle sizes less than 74 μm or 15 to 30 parts of weight of the powders of bentonite with high viscosity having particle sizes less than 74 μm into a high-speed mixer;

the granulating step comprising granulating the mixture evenly mixed by the said high-speed mixer which is equipped with an injection nozzle of water inside the vessel, and includes agitating blades provided at a plurality of stages on a rotary shaft inserted through the inside of a vessel and a bottomed entirely-porous cylindrical frame including a scraper blade rotatably provided in the form of a cage having coarse openings within the vessel and outside a locus of rotation of the agitating blades, by rotating the inner blades at a speed of 300 to 800 rpm and the outer cylindrical frame at a speed of 16 rpm or more in the opposite direction of that of the inner blades; and the making step comprising making the product by drying the granules thus obtained until they become to have a bulk density of 0.20 to 0.50 g/cm3 and a water absorbing capacity of 1.3 to 3.5 times of their own weight.

* * * * *

UNITED STATES PATENT AND TRADEMARK OFFICE
CERTIFICATE OF CORRECTION

PATENT NO.           : 7,219,624 B2                                         Page 1 of 1
APPLICATION NO. : 11/378381
DATED                   : May 22, 2007
INVENTOR(S)         : Yoichi Yasukawa It is certified that error appears in the above-identified patent and that said Letters Patent is hereby corrected as shown below:

Column 10, Line 20, change "0.50 g/cm3" to --0.50 g/cm$^3$--.

Signed and Sealed this

Fifteenth Day of April, 2008

JON W. DUDAS
*Director of the United States Patent and Trademark Office*